(12) United States Patent
Masani et al.

(10) Patent No.: US 9,841,230 B2
(45) Date of Patent: Dec. 12, 2017

(54) SYSTEM FOR ENHANCED GAS TURBINE PERFORMANCE IN A LIQUEFIED NATURAL GAS FACILITY

(75) Inventors: Karl D. Masani, Houston, TX (US); Cyrus B. Meher-Homji, Sugar Land, TX (US)

(73) Assignee: ConocoPhillips Company, Houston, TX (US)

( * ) Notice: Subject to any disclaimer, the term of this patent is extended or adjusted under 35 U.S.C. 154(b) by 1754 days.

(21) Appl. No.: 12/550,098

(22) Filed: Aug. 28, 2009

(65) Prior Publication Data

US 2010/0058801 A1 Mar. 11, 2010

Related U.S. Application Data

(60) Provisional application No. 61/095,469, filed on Sep. 9, 2008.

(51) Int. Cl.
| | |
|---|---|
| F25J 1/00 | (2006.01) |
| F01D 15/00 | (2006.01) |
| F02C 7/143 | (2006.01) |
| F25J 1/02 | (2006.01) |

(52) U.S. Cl.
CPC .......... *F25J 1/0052* (2013.01); *F01D 15/005* (2013.01); *F02C 7/143* (2013.01); *F25J 1/004* (2013.01); *F25J 1/0022* (2013.01); *F25J 1/0085* (2013.01); *F25J 1/0087* (2013.01); *F25J 1/021* (2013.01); *F25J 1/0236* (2013.01); *F25J 1/0242* (2013.01); *F25J 1/0283* (2013.01); *F25J 2220/64* (2013.01); *Y02T 50/675* (2013.01)

(58) Field of Classification Search
CPC ....................................................... F25J 1/0283
USPC .......................................................... 62/612
See application file for complete search history.

(56) References Cited

U.S. PATENT DOCUMENTS

| | | | | |
|---|---|---|---|---|
| 3,630,022 | A | * | 12/1971 | Jubb ............................. 376/391 |
| 4,509,324 | A | * | 4/1985 | Urbach et al. ............... 60/39.17 |
| 5,319,925 | A | * | 6/1994 | Hendriks et al. .......... 60/39.183 |
| 5,546,766 | A | * | 8/1996 | Higginbotham ................ 62/645 |
| 5,553,448 | A |   | 9/1996 | Farrell et al. |
| 5,611,216 | A | * | 3/1997 | Low et al. ...................... 62/612 |

(Continued)

FOREIGN PATENT DOCUMENTS

| | | |
|---|---|---|
| EP | 0651145 B1 | 9/1998 |
| WO | 01/97951 A1 | 12/2001 |

OTHER PUBLICATIONS

Roberts et al. "Large Capacity Single Train AP-XTM Hybrid LNG Process", GASTECH 2002.*

*Primary Examiner* — Frantz Jules
*Assistant Examiner* — Filip Zec
(74) *Attorney, Agent, or Firm* — ConocoPhillips Company

(57) ABSTRACT

A system for liquefying natural gas that includes a process and apparatus for enhancing the performance of one or more gas turbines. Gas turbine power output can be stabilized or even enhanced using the interstage cooling system configured according to one or more embodiments of the present invention. In one embodiment, partially compressed air from a lower compression stage of a gas turbine is cooled via indirect heat exchange with a primary coolant before being returned to a higher compression stage of the same gas turbine. Optionally, the interstage cooling system can employ one or more secondary coolants to remove the rejected heat from the primary coolant system.

35 Claims, 7 Drawing Sheets

(56) References Cited

U.S. PATENT DOCUMENTS

| | | | |
|---|---|---|---|
| 6,070,429 A * | 6/2000 | Low et al. | 62/612 |
| 6,324,867 B1 * | 12/2001 | Fanning et al. | 62/613 |
| 7,131,272 B2 | 11/2006 | Jones et al. | |
| 7,437,890 B2 * | 10/2008 | Howard | 62/646 |
| 2005/0160736 A1 * | 7/2005 | Reale et al. | 60/772 |
| 2008/0115529 A1 * | 5/2008 | Ransbarger et al. | 62/613 |
| 2008/0156036 A1 * | 7/2008 | Buijs et al. | 62/612 |
| 2008/0202159 A1 * | 8/2008 | Fountain | 62/612 |
| 2008/0264099 A1 * | 10/2008 | Mock et al. | 62/611 |
| 2009/0188280 A1 * | 7/2009 | Alekseev et al. | 62/647 |
| 2009/0277217 A1 * | 11/2009 | Ransbarger et al. | 62/612 |

* cited by examiner

SYSTEM FOR ENHANCED GAS TURBINE PERFORMANCE IN A LIQUEFIED NATURAL GAS FACILITY

CROSS-REFERENCE TO RELATED APPLICATIONS

This application claims priority benefit under 35 U.S.C. Section 119(e) of U.S. Provisional Patent Ser. No. 61/095,469 filed on Sep. 9, 2008, the entire disclosure of which is incorporated herein by reference.

BACKGROUND

1. Field of the Invention

This invention relates to methods and apparatuses for liquefying natural gas. In another aspect, the invention concerns a liquefied natural gas (LNG) facility employing a cooling system operable to enhance the performance of one or more gas turbines used in the LNG facility.

2. Description of Related Art

Cryogenic liquefaction is commonly used to convert natural gas into a more convenient form for transportation and/or storage. Because liquefying natural gas greatly reduces its specific volume, large quantities of natural gas can be economically transported and/or stored in liquefied form.

Transporting natural gas in its liquefied form can effectively link a natural gas source with a distant market when the source and market are not connected by a pipeline. This situation commonly arises when the source of natural gas and the market for the natural gas are separated by large bodies of water. In such cases, liquefied natural gas (LNG) can be transported from the source to the market using specially designed ocean-going LNG tankers.

Storing natural gas in its liquefied form can help balance periodic fluctuations in natural gas supply and demand. In particular, LNG can be "stockpiled" for use when natural gas demand is low and/or supply is high. As a result, future demand peaks can be met with LNG from storage, which can be vaporized as demand requires.

Several methods exist for liquefying natural gas. Some methods produce a pressurized LNG (PLNG) product that is useful, but requires expensive pressure-containing vessels for storage and transportation. Other methods produce an LNG product having a pressure at or near atmospheric pressure. In general, these non-pressurized LNG production methods involve cooling a natural gas stream via indirect heat exchange with one or more refrigerants and then expanding the cooled natural gas stream to near atmospheric pressure. In addition, most LNG facilities employ one or more systems to remove contaminants (e.g., water, acid gases, nitrogen, and ethane and heavier components) from the natural gas stream at different points during the liquefaction process.

Typically, LNG facilities employ one or larger, multi-stage refrigerant compressors to circulate refrigerant used to cool the natural gas feed stream processed in the facility. These industrial compressors are often driven by gas turbines, which combust fuel with a stream of compressed air to generate power that can then be utilized to drive the compressor. The performance of these gas turbines, which can generally be correlated to the turbine's power output and efficiency, is highly dependent on ambient air conditions. For example, increases in ambient air temperature typically lead to decline in turbine power output. Reductions in turbine power output translate to diminished compressor performance, which, ultimately translates to reduced LNG production. Thus, it may be desirable to maintain and/or increase LNG production through enhanced gas turbine operation.

SUMMARY

In one embodiment of the present invention, there is provided a process for liquefying a natural gas stream, said process comprising: (a) cooling at least a portion of said natural gas stream via indirect heat exchange with a first refrigerant in a first refrigeration cycle to thereby produce a cooled natural gas stream; (b) further cooling at least a portion of said cooled natural gas stream via indirect heat exchange with a second refrigerant in a second refrigeration cycle to thereby provide a further cooled natural gas stream; and (c) cooling a partially compressed air stream via indirect heat exchange with a primary coolant to thereby provide a cooled partially compressed air stream, wherein said partially compressed air stream is withdrawn from an intermediate compression stage of a gas turbine used to drive at least one refrigerant compressor associated with said first and/or said second refrigeration cycle.

In another embodiment of the present invention, there is provided a process for liquefying a natural gas stream, said process comprising: (a) compressing a first refrigerant stream in a first refrigerant compressor to thereby provide a first compressed refrigerant stream, wherein said first refrigerant compressor is at least partially driven by a first gas turbine; (b) cooling a first air stream via indirect heat exchange with at least a portion of said first refrigerant in a first heat exchanger to thereby provide a first cooled air stream; and (c) introducing at least a portion of said first cooled air stream into said first gas turbine.

In yet another embodiment of the present invention there is provided a liquefied natural gas (LNG) facility comprising a first refrigeration cycle and a first heat exchange zone. The first refrigeration cycle comprises a first refrigerant compressor, a first refrigerant chiller, and a first gas turbine. The first refrigerant compressor is operable to produce a compressed first refrigerant stream and first refrigerant chiller is operable to cool a natural gas stream via indirect heat exchange with the compressed first refrigerant stream. The first compressor is driven by the first gas turbine, which is a multi-stage, multi-shaft gas turbine comprising a first low compression stage and a first high compression stage. The first heat exchange zone is operable to cool a first partially compressed air stream withdrawn from the first low compression stage via indirect heat exchange with a first coolant to thereby produce a first cooled air stream. The first high compression stage is configured to receive the first cooled air stream.

BRIEF DESCRIPTION OF THE FIGURES

Certain embodiments of the present invention are described in detail below with reference to the enclosed figures, wherein.

DETAILED DESCRIPTION

Figure 1:
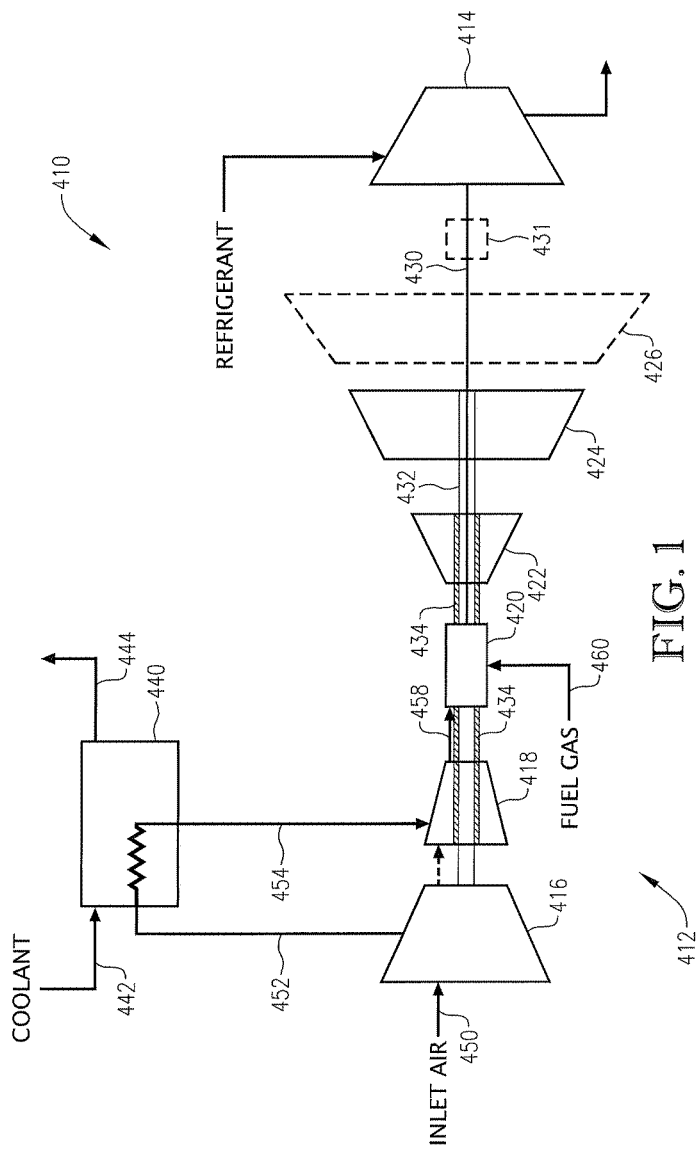
FIG. 1 is a simplified overview of compressor/driver system including an interstage cooling zone configured according to one embodiment of the present invention.

Referring first to FIG. 1, a schematic diagram of compressor-driver system 410 employing an interstage cooling system is generally illustrated as comprising a gas turbine 412 mechanically coupled to and operable to power a compressor 414. In one embodiment, gas turbine 412 can be directly coupled to compressor 414, while, in another embodiment, gas turbine 412 can be indirectly coupled to compressor 414 via a speed manipulating device 431, as shown in FIG. 1. Examples of speed manipulating devices can include, but are not limited to, gear boxes or torque converters. In addition, compressor/driver system 410 comprises an interstage air cooler 440, operable to cool at least a portion of the partially compressed air stream exiting one or more compression stages of gas turbine 412.

Gas turbine 412 can be any commercially available industrial gas turbine. Gas turbine 412 can comprise a single shaft or a multi-shaft configuration and can comprise a frame gas turbine, a modular gas turbine, an aeroderivative gas turbine, or any combination thereof. Examples of suitable frame gas turbines can include, but are not limited to a single-shaft GE Frame-5, Frame-6, Frame-7, or Frame-9 gas turbines available from GE Power Systems, Atlanta, Ga. or the equivalent thereof. Examples of modular gas turbines can include Siemens SGT-600 or SGT-700 gas turbines (available from Siemens AG in Erlangen, Germany) and Solar Mars® or Titan™ gas turbines (available from Solar Turbines Incorporated in Peoria, Ill.) or the equivalent thereof. Examples of aeroderivative gas turbines can include, but are not limited to, a GE LM1600, LM2000, LM2500, LM2500+, LM6000, or LMS-100® (available from GE Power Systems in Atlanta, Ga.) or the equivalent thereof.

In one embodiment illustrated in FIG. 1, gas turbine 412 can have a three-shaft configuration. According to this embodiment, gas turbine 412 can comprise a low pressure compression stage 416, a high pressure compression stage 418, a combustion chamber 420, a high pressure turbine 422, a low pressure turbine 424, and an optional power turbine 426. In one embodiment illustrated in FIG. 1, power turbine 426 can be directly or indirectly mechanically coupled to low pressure compression stage 416 and compressor 414 via a first inner concentric shaft 430. In another embodiment, gas turbine 412 may not include power turbine 426. Low pressure compression stage 416 and low pressure expansion stage 424 can be mechanically coupled via a second concentric inner shaft 432, while high pressure compression stage 418 and high pressure expansion stage 426 are drivingly coupled by a third concentric outer shaft 434, as illustrated in FIG. 1.

Compressor 414 can be any type of multi-stage industrial compressor capable of sequentially compressing a gaseous stream to successively higher pressures. In one embodiment compressor 414 can have at least one, at least 2, or at least 3 compression stages (not shown). Multistage compressor 414 can be a centrifugal compressor, an axial compressor, or any combination thereof.

In general, interstage cooler 440 can be any heat exchanger operable to cool the incoming stream of partially compressed air withdrawn from low pressure compression stage 416 by at least about 1° C. (1.8° F.), at least about 2° C. (3.6° F.), at least about 5° C. (9° F.), or at least 8° C. (14.4° F.). In another embodiment, interstage cooler 440 can cool the partially compressed air stream in conduit 452 by no more than 25° C. (45° F.), no more than 20° C. (36° F.), no more than 15° C. (27° F.), or no more than 10° C. (18° F.). In one embodiment, interstage cooler 440 can comprise a direct heat exchanger that employs one or more direct heat exchange methods. Examples of suitable direct heat exchange methods include, inlet fogging, misting, and wet compression techniques. When interstage cooler 440 employs a direct heat exchanger, one or more suitable heat transfer fluids, such as, for example, water, alcohols, or light hydrocarbons, may be employed. In another embodiment, interstage cooler 440 can comprise an indirect heat exchanger. Examples of suitable indirect heat exchangers can include, but are not limited to, a shell-and-tube heat exchanger, a core-in-kettle heat exchanger, and a plate-fin heat exchanger. When interstage cooler 440 employs an indirect heat exchanger, one or more suitable heat transfer fluids, including, for example, water, glycols, alcohols, commercially available heat transfer fluids, and any combination thereof can be employed in interstage cooler 440.

Turning now to the operation of compressor/driver system 410 illustrated in FIG. 1, an uncompressed stream of inlet air in conduit 450 can be introduced into an inlet of low pressure compression stage 416 of gas turbine 412. The combustion air stream can then be at least partially compressed and at least a portion of the resulting stream can be withdrawn from low pressure compression stage 416 via conduit 452. If present, the remaining partially compressed air stream can pass to high compression stage 418, as illustrated by the dashed line in FIG. 1.

Thereafter, the at least partially compressed stream in conduit 452 can be introduced into an interstage air cooler 440, wherein at least a portion of the stream can be cooled via an indirect heat exchange with a coolant in conduit 442, as shown in FIG. 1. The coolant can comprise any suitable heat transfer fluid capable of removing at least a portion of the heat from the partially compressed air stream in conduit 452. The coolant can comprise water, glycols, alcohols, light hydrocarbons, and any combination thereof. Specific configurations employing different types of refrigerants will be discussed in detail shortly, with respect to FIGS. 3, 4a, 4b, 5a, and 5b. As shown in FIG. 1, the resulting, cooled, partially compressed air stream in conduit 454 can then be introduced into high pressure compression stage 418, as shown in FIG. 1.

As illustrated in FIG. 1, the compressed air stream exiting high pressure compression stage 418 via conduit 458 can subsequently be introduced into combustion chamber 420, wherein the air stream can be combusted with a fuel gas introduced into combustion chamber 420 via conduit 460.

The warm combustion gases exiting combustion chamber 420 can be sequentially expanded in high stage expansion stage 422, low stage expansion stage 424, and power turbine 426. The resulting energy, which can be at least partially translated into rotational energy, can be used to respectively power low pressure compression stage 416 (via first inner concentric shaft 432), high compression stage 422 (via outer concentric shaft 434), and load (e.g., driven) compressor 414 (via second inner concentric shaft 430).

In general, cooling an at least partially compressed air stream withdrawn from the low pressure compression stage prior to reintroducing the cooled stream into the high pressure compression stage can increase the power output of the gas turbine by at least about 10 percent, at least about 15 percent, at least about 20 percent, or at least 25 percent, as compared to the power output of a gas turbine that does not employ this type of interstage cooling. In one embodiment, interstage air cooler 440 can be operable to cool the stream of partially compressed air in conduit 452 by an amount in the range of from about 1 to about 25° C., about 2 to about 20° C., or 5 to 15° C. Typically, the air stream in conduit 452 can have a temperature greater than about 20° C. (68° F.), greater than about 25° C. (77° F.), or greater than 30° C. (86° F.), while the stream in conduit 454 can have a temperature less than about 15° C. (59° F.), less than about 10° C. (50° F.), or less than 5° C. (41° F.).

Figure 2:
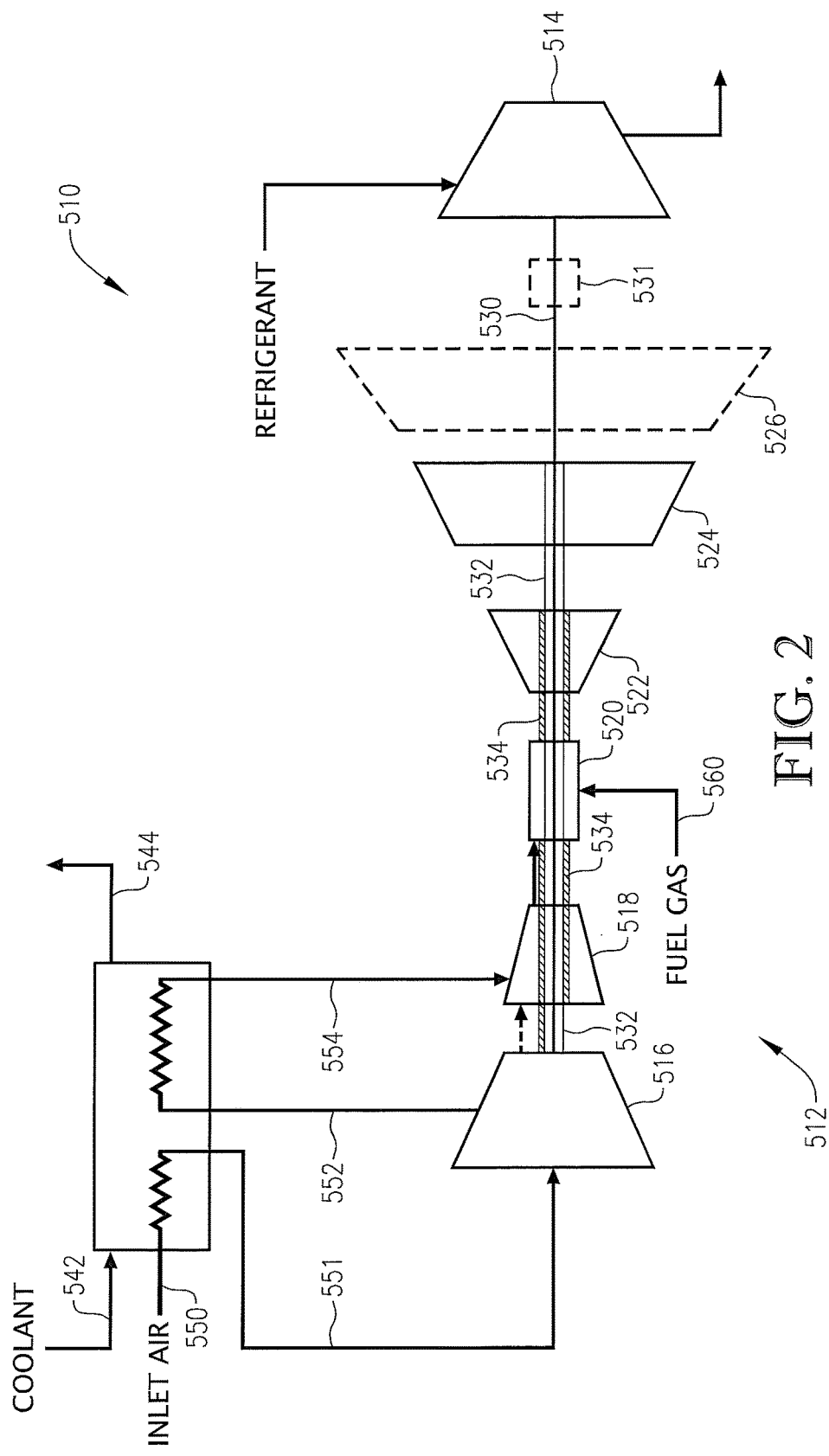
FIG. 2 is a simplified overview of a compressor/driver system including an interstage cooling zone configured according to another embodiment of the present invention.

Another embodiment of a simplified compressor/driver system 510 employing an interstage cooler 540 is illustrated in FIG. 2. The configuration and operation of the compressor/driver system 510 illustrated in FIG. 2 is similar to that as previously described in FIG. 1, except interstage cooler 540 of compressor/driver system 510 further includes a means for additionally cooling the inlet combustion air stream introduced into low pressure compression stage 516 of gas turbine 512. The operation of compressor/driver system 510 illustrated in FIG. 2, as it differs from the operation of compressor/driver system 410 previously described with respect to FIG. 1, will now be discussed in detail.

A stream of uncompressed inlet air in conduit 550 enters interstage cooler 540, wherein the stream can be cooled via indirect heat exchange with a coolant stream entering interstage cooler 540 via conduit 542. In one embodiment, interstage cooler 540 can be operable to cool the incoming uncompressed air stream by at least about 2° C. (3.6° F.), at least about 5° C. (9° F.), at least about 8° C. (14.4° F.), or at least 10° C. (18° F.). Generally, the temperature of the air stream in conduit 550 can be greater than about 8° C. (46° F.), at least about 10° C. (50° F.), at least about 15° C. (59° F.), about 25° C. (77° F.), greater than about 30° C. (86° F.), greater than about 32° C. (90° F.), greater than about 35° C. (95° F.), or greater than about 37° C. (98° F.), while the temperature of the cooled air stream withdrawn from interstage cooler 540 via conduit 551 can be less than about 20° C. (68° F.), less than about 15° C. (59° F.), less than about 10° C. (50° F.), or less than 5° C. (41° F.). Although illustrated as a single heat exchanger in FIG. 2, in another embodiment, interstage cooler 540 can comprise two or more separate heat exchangers, each capable of cooling at least a portion of the combustion air and/or partially compressed air streams associated with gas turbine 512.

As shown in FIG. 2, the cooled air stream in conduit 551 can then be introduced into the combustion air inlet of low pressure compression stage 516 of gas turbine 512. Subsequently, a stream of partially compressed air withdrawn from the outlet of low pressure compression stage 516 can be routed to interstage cooler 540 can continue through compressor/driver system 510 in an analogous manner as discussed in detail previously with respect to FIG. 1.

According to one embodiment, the present invention can be implemented in a facility used to cool natural gas to its liquefaction temperature to thereby produce liquefied natural gas (LNG). The LNG facility generally employs one or more refrigerants to extract heat from the natural gas and then reject the heat to the environment. Numerous configurations of LNG systems exist, and the present invention may be implemented in many different types of LNG systems.

In one embodiment, the present invention can be implemented in a mixed refrigerant LNG system. Examples of mixed refrigerant processes can include, but are not limited to, a single refrigeration system using a mixed refrigerant, a propane pre-cooled mixed refrigerant system, and a dual mixed refrigerant system. In general, mixed refrigerants can comprise hydrocarbon and/or non-hydrocarbon components. Examples of suitable hydrocarbon components typically employed in mixed refrigerants can include, but are not limited to, methane, ethane, ethylene, propane, propylene, as well as butane and butylene isomers. Non-hydrocarbon components generally employed in mixed refrigerants can include carbon dioxide and nitrogen. Mixed refrigerant processes employ at least one mixed component refrigerant, but can additionally employ one or more pure-component refrigerants as well.

In another embodiment, the present invention is implemented in a cascade LNG system employing a cascade-type refrigeration process using one or more pure component refrigerants. The refrigerants utilized in cascade-type refrigeration processes can have successively lower boiling points in order to maximize heat removal from the natural gas stream being liquefied. Additionally, cascade-type refrigeration processes can include some level of heat integration. For example, a cascade-type refrigeration process can cool one or more refrigerants having a higher volatility via indirect heat exchange with one or more refrigerants having a lower volatility. In addition to cooling the natural gas stream via indirect heat exchange with one or more refrigerants, cascade and mixed-refrigerant LNG systems can employ one or more expansion cooling stages to simultaneously cool the LNG while reducing its pressure to near atmospheric pressure.

Figure 3:
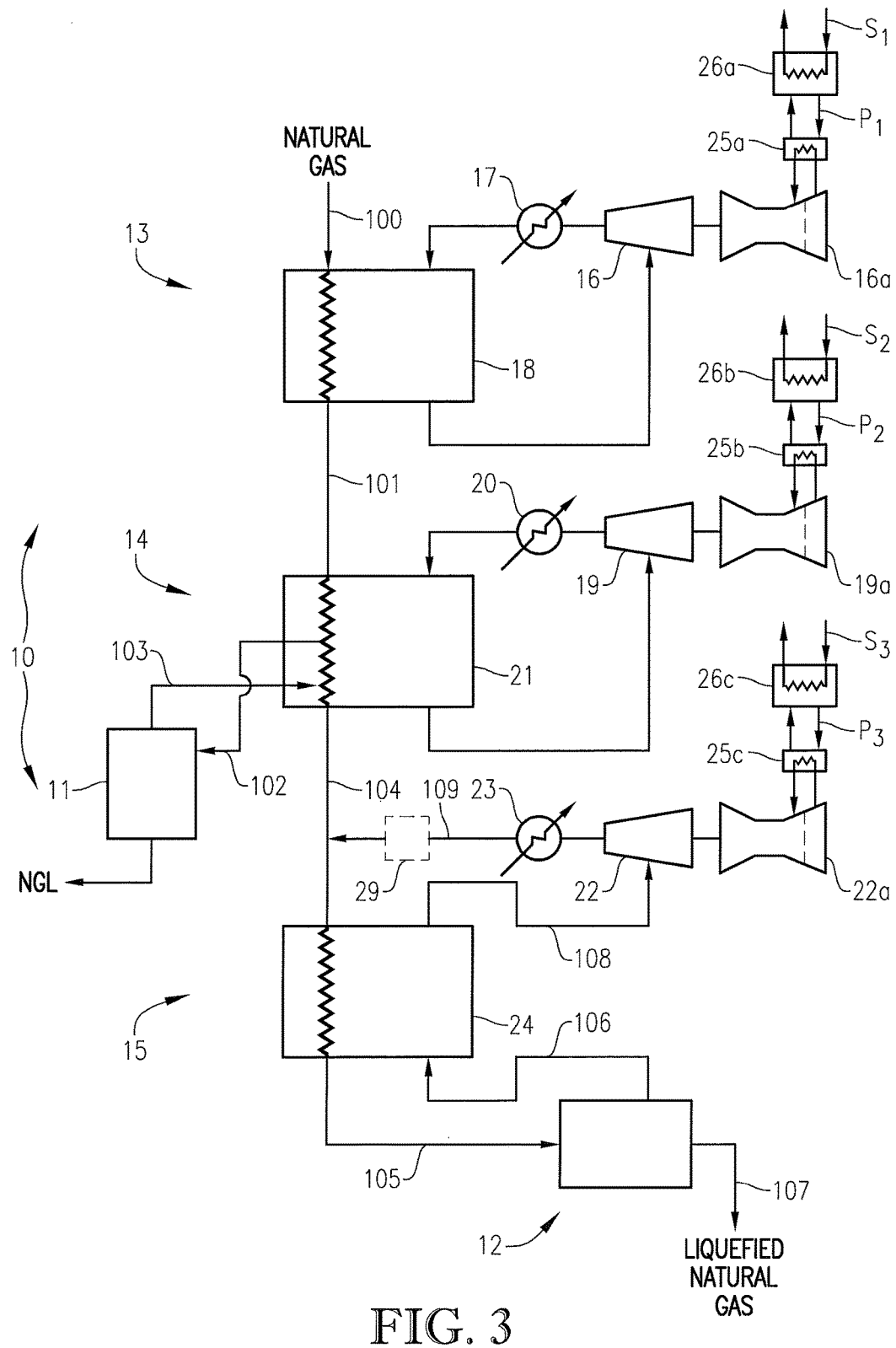
FIG. 3 is a simplified overview of a cascade-type LNG facility configured in accordance with one embodiment of the present invention.

FIG. 3 illustrates one embodiment of a simplified LNG facility employing a turbine inlet air cooling system capable of increasing the efficiency and power of one or more gas turbines employed therein. The cascade-type LNG facility of FIG. 3 generally comprises a cascade cooling section 10, a heavies removal zone 11, and an expansion cooling section 12. Cascade cooling section 10 is depicted as comprising a first mechanical refrigeration cycle 13, a second mechanical refrigeration cycle 14, and a third mechanical refrigeration cycle 15. In general, first, second, and third refrigeration cycles 13, 14, 15 can be closed-loop refrigeration cycles, open-loop refrigeration cycles, or any combination thereof. In one embodiment of the present invention, first and second refrigeration cycles 13 and 14 can be closed-loop cycles, and third refrigeration cycle 15 can be an open-loop cycle that utilizes a refrigerant comprising at least a portion of the natural gas feed stream undergoing liquefaction.

In accordance with one embodiment of the present invention, first, second, and third refrigeration cycles 13, 14, 15 can employ respective first, second, and third refrigerants having successively lower boiling points. For example, the first, second, and third refrigerants can have mid-range boiling points at standard pressure (i.e., mid-range standard boiling points) within about 10° C. (18° F.), within about 5°

C. (9° F.), or within 2° C. (3.6° F.) of the standard boiling points of propane, ethylene, and methane, respectively. In one embodiment, the first refrigerant can comprise at least about 75 mole percent, at least about 90 mole percent, at least 95 mole percent, or can consist essentially of propane, propylene, or mixtures thereof. The second refrigerant can comprise at least about 75 mole percent, at least about 90 mole percent, at least 95 mole percent, or can consist essentially of ethane, ethylene, or mixtures thereof. The third refrigerant can comprise at least about 75 mole percent, at least about 90 mole percent, at least 95 mole percent, or can consist essentially of methane.

As shown in FIG. 3, each of first, second, and third refrigeration cycles 13, 14, 15 employ respective first, second, and third refrigerant compressors 16, 19, 22, to compress the first, second, and third refrigerants used to cool the natural gas feed stream. In general, each of first, second, and third refrigerant compressors 16, 19, 22 comprise large, multi-stage compressors driven by one or more gas turbines 16a, 19a, and 22a. Although illustrated in FIG. 3 as single gas turbines, in one embodiment, compressor 16, 19, and/or 22 can be driven by two or more turbines. In another embodiment, first, second, and third refrigerant compressors 16, 19, 22 can each comprise two or more compressors driven by at least one gas turbine 16a, 19a, 22a. Typically, this configuration can be useful when LNG facility 10 comprises at least one production train. In general, each gas turbine 16a, 19a, 22a can combust a fuel gas stream with a stream of filtered ambient air to thereby provide energy to drive an expander. This energy is then at least partially translated into rotational energy, which can be used to drive refrigerant compressors 16, 19, 22 via a common shaft.

Gas turbines 16a, 19a, 22a, can be any commercially available industrial gas turbine. In general, gas turbines 16a, 19a, and/or 22a can have a single shaft or a multi-shaft configuration. Typically, multi-shaft gas turbines can comprise two (i.e., dual-shaft) or three (i.e., triple-shaft) shafts, but other multi-shaft turbines are equally suitable. The plurality of shafts employed in a multi-shaft gas turbine can be concentric or can be positioned substantially parallel to one another. Single shaft gas turbines can also comprise an auxiliary or "helper" motor to provide supplemental power during turbine start up. Additional details regarding specific types of gas turbines were discussed previously with respect to FIG. 1.

As shown in FIG. 3, LNG facility 10 can further comprise a plurality of interstage coolers 25a-c operable to cool one or more partially compressed streams originating from gas turbines 16a, 19a, and 22a via direct and/or indirect heat exchange with a primary coolant in conduits P1, P2, and P3. As illustrated in FIG. 3, primary coolant introduced into and withdrawn from interstage coolers 25a-c can originate from coolant sources 26a-c. In general, coolant sources 26a-c can be any suitable mechanical, thermal, or absorptive heat sinks capable of removing at least a portion of heat stored in the warmed primary coolant streams withdrawn from interstage coolers 25a-c. According to one embodiment, coolant sources 26a-c can comprise multiple zones within a single coolant system; while, according to another embodiment, coolant sources 26a-c can comprise one or more independent coolant systems. In one embodiment illustrated in FIG. 3, coolant sources 26a-c can employ streams of secondary coolant in conduits S1, S2, S3 to remove at least a portion of the heat stored in warmed primary coolant streams in conduits P1, P2, P3 via direct and/or indirect heat exchange. As shown in FIG. 3, the resulting cooled primary coolant streams can be re-employed in interstage coolers 25a-c and can continue as previously discussed.

Primary and secondary coolant streams can comprise any suitable heat transfer fluid and combinations thereof. Primary and/or secondary coolant streams can comprise hydrocarbon refrigerants, non-hydrocarbon refrigerants, and combinations thereof. According to one embodiment, the primary and/or secondary coolants can comprise water, glycols, and/or alcohols or can be one or more commercially available heat transfer media, such as, for example, DOW-FROST™ (commercially available from Dow Chemical Company, Midland, Mich.). In another embodiment, the primary and/or secondary coolant can comprise air, nitrogen, or carbon dioxide. In yet another embodiment, primary and/or secondary coolant streams can comprise a portion of one or more of the first, second, and/or third refrigerants employed in first, second, and/or third refrigeration cycles 13, 14, 15 of LNG facility 10, depicted in FIG. 3. Specific configurations of interstage coolers 25a-c and coolant sources 26a-c will be discussed in detail shortly with respect to FIGS. 4a, 4b, 5a, and 5b.

Turning back to FIG. 3, in addition to first refrigerant compressor 16, first refrigeration cycle 13 can comprise a first cooler 17 and a first refrigerant chiller 18. First refrigerant compressor 16 can discharge a stream of compressed first refrigerant, which can subsequently be cooled and at least partially liquefied in cooler 17. The resulting refrigerant stream can then enter first refrigerant chiller 18, wherein at least a portion of the refrigerant stream can cool the incoming natural gas stream in conduit 100 via indirect heat exchange with the vaporizing first refrigerant. The gaseous refrigerant can exit first refrigerant chiller 18 and can then be routed to an inlet port of first refrigerant compressor 16 to be recirculated as previously described.

First refrigerant chiller 18 can comprise one or more cooling stages operable to reduce the temperature of the incoming natural gas stream in conduit 100 by an amount in the range of from about 20° C. (36° F.) to about 120° C. (216° F.), about 25° C. (45° F.) to about 110° C. (198° F.), or 40° C. (72° F.) to 85° C. (153° F.). Typically, the natural gas entering first refrigerant chiller 18 via conduit 100 can have a temperature in the range of from about −20° C. (−4° F.) to about 95° C. (203° F.), about −10° C. (14° F.) to about 75° C. (167° F.), or 10° C. (50° F.) to 50° C. (122° F.). In general, the temperature of the cooled natural gas stream exiting first refrigerant chiller 18 can be in the range of from about −55° C. (−67° F.) to about −15° C. (5° F.), about −45° C. (−49° F.) to about −20° C. (−4° F.), or −40° C. (−40° F.) to −30° C. (−22° F.). In general, the pressure of the natural gas stream in conduit 100 can be in the range of from about 690 kPa (100.1 psi) to about 20,690 kPa (3,000.8 psi), about 1,725 kPa (250.2 psi) to about 6,900 kPa (1,000.8 psi), or 2,760 kPa (400.3 psi) to 5,500 kPa (797.7 psi). Because the pressure drop across first refrigerant chiller 18 can be less than about 690 kPa (100.1 psi), less than about 345 kPa (50 psi), or less than 175 kPa (25.4 psi), the cooled natural gas stream in conduit 101 can have substantially the same pressure as the natural gas stream in conduit 100.

As illustrated in FIG. 3, the cooled natural gas stream (also referred to herein as the "cooled predominantly methane stream") exiting first refrigeration cycle 13 can then enter second refrigeration cycle 14, which can comprise a second refrigerant compressor 19, a second cooler 20, and a second refrigerant chiller 21. Compressed refrigerant can be discharged from second refrigerant compressor 19 and can subsequently be cooled and at least partially liquefied in cooler 20 prior to entering second refrigerant chiller 21.

Second refrigerant chiller 21 can employ a plurality of cooling stages to progressively reduce the temperature of the predominantly methane stream in conduit 101 by an amount in the range of from about 30° C. (54° F.) to about 100° C. (180° F.), about 35° C. (63° F.) to about 85° C. (153° F.), or 50° C. (90° F.) to 70° C. (126° F.) via indirect heat exchange with the vaporizing second refrigerant. As shown in FIG. 3, the vaporized second refrigerant can then be returned to an inlet port of second refrigerant compressor 19 prior to being recirculated in second refrigeration cycle 14, as previously described.

The natural gas feed stream in conduit 100 will usually contain ethane and heavier components ($C_2$+), which can result in the formation of a $C_2$+ rich liquid phase in one or more of the cooling stages of second refrigeration cycle 14. In order to remove the undesired heavies material from the predominantly methane stream prior to complete liquefaction, at least a portion of the natural gas stream passing through second refrigerant chiller 21 can be withdrawn via conduit 102 and processed in heavies removal zone 11, as shown in FIG. 3. The stream in conduit 102 can have a temperature in the range of from about −110° C. (−166° F.) to about −45° C. (−49° F.), about −95° C. (−139° F.) to about −50° C. (−58° F.), or −85° C. (−121° F.) to −65° C. (−85° F.). Typically, the stream in conduit 102 can have pressure that is within about 5 percent, about 10 percent, or 15 percent of the pressure of the natural gas feed stream in conduit 100.

Heavies removal zone 11 can comprise one or more gas-liquid separators operable to remove at least a portion of the heavy hydrocarbon material from the predominantly methane stream. Typically, heavies removal zone 11 can be operated to remove benzene and other high molecular weight aromatic components, which can freeze in subsequent liquefaction steps and plug downstream process equipment. In addition, heavies removal zone 11 can be operated to recover the heavy hydrocarbons in a natural gas liquids (NGL) product stream. Examples of typical hydrocarbon components included in NGL streams can include ethane, propane, butane isomers, pentane isomers, and hexane and heavier components (i.e., $C_6$+). The extent of NGL recovery from the predominantly methane stream ultimately impacts one or more final characteristics of the LNG product, such as, for example, Wobbe index, BTU content, higher heating value (HHV), ethane content, and the like. In one embodiment, the NGL product stream exiting heavies removal zone 11 can be subjected to further fractionation in order to obtain one or more pure component streams. Often, NGL product streams and/or their constituents can be used as gasoline blendstock.

As shown in FIG. 3, a heavies-depleted, predominantly methane stream can be withdrawn from heavies removal column 25 via conduit 103 and can be routed back to second refrigeration cycle 14. Generally, the stream in conduit 103 can have a temperature in the range of from about −100° C. (−148° F.) to about −40° C. (−40° F.), about −90° C. (−130° F.) to about −50° C. (−58° F.), or −80° C. (−112° F.) to −55° C. (−67° F.). The pressure of the stream in conduit 103 can typically be in the range of from about 1,380 kPa (200.15 psi) to about 8,275 kPa (1200.2 psi), about 2,420 kPa (351 psi) to about 5,860 kPa (849.9 psi), or 3,450 kPa (500.4 psi) to 4,830 kPa (700.5 psi).

As shown in FIG. 3, the predominantly methane stream in conduit 103 can subsequently be further cooled via second refrigerant chiller 21. In one embodiment, the stream exiting second refrigerant chiller 21 via conduit 104 can be completely liquefied and can have a temperature in the range of from about −135° C. (−211° F.) to about −55° C. (−67° F.), about −115° C. (−175° F.) to about −65° C. (−85° F.), or −95° C. (−139° F.) to −85° C. (−121° F.). Generally, the stream in conduit 104 can be at approximately the same pressure the natural gas stream entering the LNG facility in conduit 100.

As illustrated in FIG. 3, the pressurized LNG-bearing stream in conduit 104 can combine with a stream in conduit 109 prior to entering third refrigeration cycle 15, which is depicted as generally comprising a third refrigerant compressor 22, a cooler 23, and a third refrigerant economizer 24. Compressed refrigerant discharged from third refrigerant compressor 22 enters cooler 23, wherein the refrigerant stream is cooled via indirect heat exchange prior to entering cooling zone 29. Cooling zone 29 can comprise one or more cooling stages operable to cool and at least partially condense the predominantly methane stream in conduit 109. In one embodiment, cooling zone 29 can be at least partly defined within one or more of the first or second refrigerant chillers 18, 21 and/or within third refrigerant economizer 24. When a portion of cooling zone 29 is defined within one or more of first, second, and third refrigeration cycles 13, 14, 15, in one embodiment, the respective refrigeration cycles can define one or more additional cooling passes.

In one embodiment depicted in FIG. 3, third refrigerant economizer 24 can comprise one or more cooling stages operable to further cool the pressurized predominantly methane stream in conduit 104 via indirect heat exchange with the vaporizing refrigerant. In one embodiment, the temperature of the pressurized LNG-bearing stream in conduit 105 can be reduced by an amount in the range of from about 2° C. (3.6° F.) to about 35° C. (63° F.), about 3° C. (5.4° F.) to about 30° C. (54° F.), or 5° C. (9° F.) to 25° C. (45° F.) in third refrigerant economizer 24. Typically, the temperature of the pressurized LNG-bearing stream exiting third refrigerant economizer 24 can be in the range of from about −170° C. (−274° F.) to about −55° C. (−67° F.), about −145° C. (−229° F.) to about −70° C. (−94° F.), or −130° C. (−202° F.) to −85° C. (−121° F.).

As shown in FIG. 3, the cooled LNG-bearing stream exiting third refrigerant economizer 24 can then be routed to expansion cooling section 12, wherein the stream can be at least partially subcooled via sequential pressure reduction to near atmospheric pressure by passage through one or more expansion stages. Expansion cooling section 12 can comprise in the range of from about 1 to about 6, about 2 to about 5, or 3 to 4 expansion stages. In one embodiment, each expansion stage can reduce the temperature of the LNG-bearing stream by an amount in the range of from about 5° C. (9° F.) to about 35° C. (63° F.), about 7.5° C. (13.5° F.) to about 30° C. (54° F.), or 10° C. (18° F.) to 25° C. (45° F.). Each expansion stage comprises one or more expanders, which reduce the pressure of the liquefied stream to thereby evaporate or flash a portion thereof. Examples of suitable expanders can include, but are not limited to, Joule-Thompson valves, venturi nozzles, and turboexpanders. In one embodiment of the present invention, expansion section 12 can reduce the pressure of the LNG-bearing stream in conduit 105 by an amount in the range of from about 520 kPa (75.4 psi) to about 3,100 kPa (449.6 psi), about 860 kPa (124.7 psi) to about 2,070 kPa (300.2 psi), or 1,030 kPa (149.4 psi) to 1,550 kPa (224.8 psi).

Each expansion stage may additionally employ one or more vapor-liquid separators operable to separate the vapor phase (i.e., the flash gas stream) from the cooled liquid stream. As previously discussed, third refrigeration cycle 15 can comprise an open-loop refrigeration cycle, closed-loop refrigeration cycle, or any combination thereof. When third refrigeration cycle 15 comprises a closed-loop refrigeration cycle, the flash gas stream exiting expansion section is generally employed as a refrigerant. When third refrigeration cycle 15 comprises an open-loop refrigeration cycle, at least a portion of the flash gas stream exiting expansion section 12 be used as a refrigerant to cool at least a portion of the natural gas stream in conduit 104, and the remaining portion of the flash gas may be used in one or more locations internal or external to the LNG facility. Generally, when third refrigerant cycle 15 comprises an open-loop cycle, the third refrigerant can comprise at least 50 weight percent, at least about 75 weight percent, or at least 90 weight percent of flash gas from expansion section 12, based on the total weight of the stream. As illustrated in FIG. 3, the flash gas exiting expansion section 12 via conduit 106 can enter third refrigerant economizer 24, wherein the stream can cool at least a portion of the natural gas stream entering third refrigerant economizer 24 via conduit 104. The resulting warmed refrigerant stream can then exit third refrigerant economizer 24 via conduit 108 and can thereafter be routed to an inlet port of third refrigerant compressor 22. As shown in FIG. 3, third refrigerant compressor 22 discharges a stream of compressed third refrigerant, which is thereafter cooled in cooler 23. The resulting cooled methane stream in conduit 109 can then be further cooled in cooling zone 29 before combining with the natural gas stream in conduit 104 prior to entering third refrigerant economizer 24, as previously discussed.

As shown in FIG. 3, the liquid stream exiting expansion section 12 via conduit 107 can comprise LNG. In one embodiment, the LNG in conduit 107 can have a temperature in the range of from about −130° C. (−202° F.) to about −185° C. (−301° F.), about −145° C. (−229° F.) to about −170° C. (−274° F.), or −155° C. (−247° F.) to −165° C. (−265° F.) and a pressure in the range of from about 0 kPa (0 psia) to about 345 kPa (50 psia), about 35 kPa (5.1 psia) to about 210 kPa (30.5 psia), or 82.7 kPa (10.2 psia) to 210 kPa (20.3 psia).

According to one embodiment, the LNG in conduit 107 can comprise at least about 85 volume percent of methane, at least about 87.5 volume percent methane, at least about 90 volume percent methane, at least about 92 volume percent methane, at least about 95 volume percent methane, or at least 97 volume percent methane. In another embodiment, the LNG in conduit 107 can comprise less than about 15 volume percent ethane, less than about 10 volume percent ethane, less than about 7 volume percent ethane, or less than 5 volume percent ethane. In yet another embodiment, the LNG in conduit 107 can have less than about 2 volume percent $C_3^+$ material, less than about 1.5 volume percent $C_3^+$ material, less than about 1 volume percent $C_3^+$ material, or less than 0.5 volume percent $C_3^+$ material. In one embodiment (not shown), the LNG in conduit 107 can subsequently be routed to storage and/or shipped to another location via pipeline, ocean-going vessel, truck, or any other suitable transportation means. In one embodiment, at least a portion of the LNG can be subsequently vaporized for pipeline transportation or for use in applications requiring vapor-phase natural gas.

Turning now to FIGS. 4a-b and 5a-b, multiple embodiments of specific configurations of LNG facilities as described previously with respect to FIG. 3 are illustrated. To facilitate an understanding of FIGS. 4a-b and 5a-b, the following numeric nomenclature was employed. Items numbered 31 through 49 correspond to process vessels and equipment directly associated with first propane refrigeration cycle 30, and items numbered 51 through 69 correspond to process vessels and equipment related to second ethylene refrigeration cycle 50. Items numbered 71 through 94 correspond to process vessels and equipment associated with third methane refrigeration cycle 70 and/or expansion section 80. Items numbered 96 through 99 are process vessels and equipment associated with heavies removal zone 95. Items numbered 100 through 199 correspond to flow lines or conduits that contain predominantly methane streams. Items numbered 200 through 299 correspond to flow lines or conduits which contain predominantly ethylene streams. Items numbered 300 through 399 correspond to flow lines or conduits that contain predominantly propane streams. Items numbered 600 through 699 correspond to flow lines or conduits as well as process vessels and equipment associated with an interstage cooling system depicted in FIG. 4b, while items numbered 700 through 799 correspond to flow lines or conduits as well as process vessels and equipment associated with an interstage cooling system depicted in FIG. 5b.

Figure 4A:
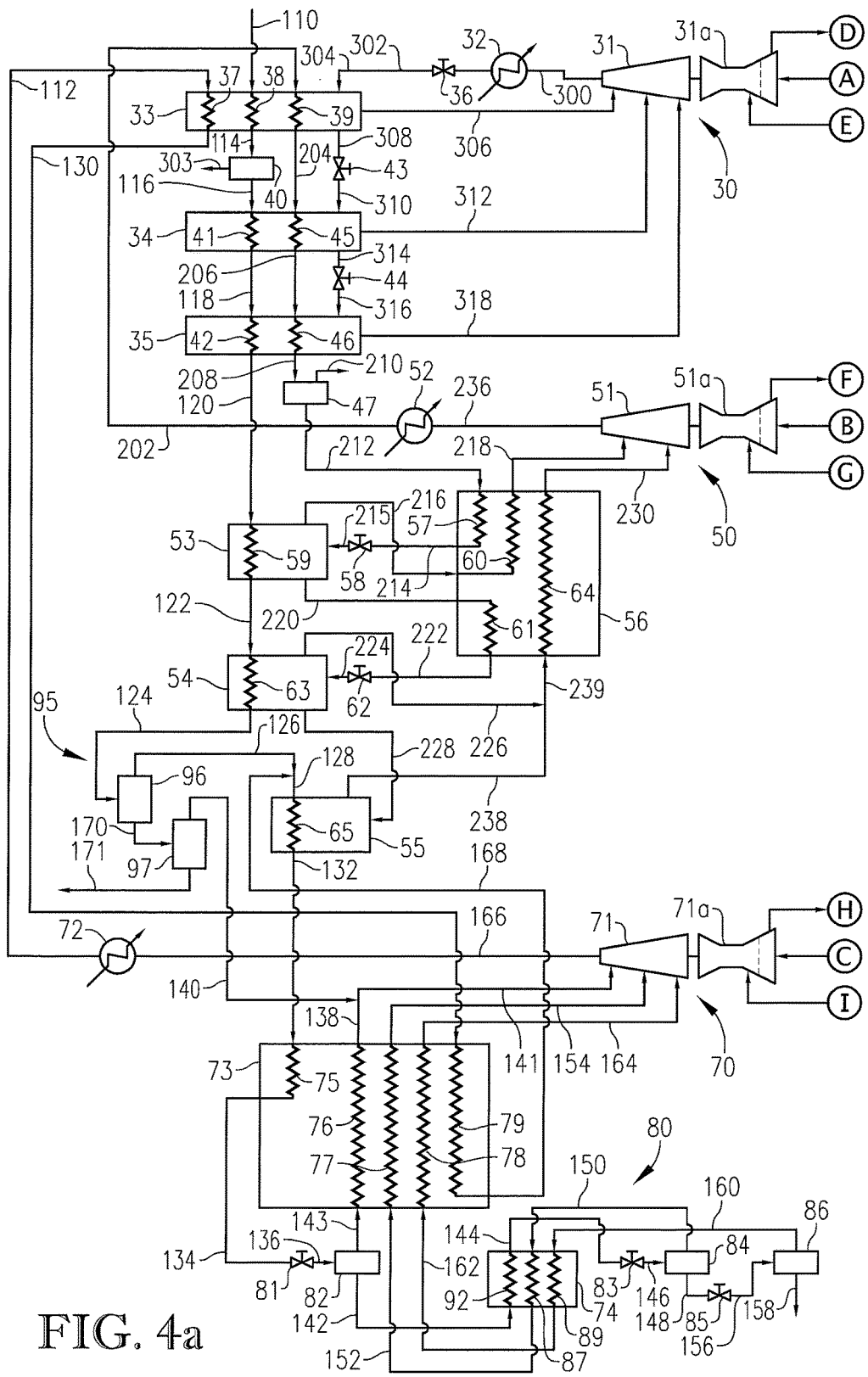
FIG. 4a is a schematic diagram of an LNG facility configured in accordance with one embodiment of the present invention with portions of the LNG facility connected to lines A, B, C, D, E, F, G, H, and I being illustrated in FIG. 4b.
Figure 4B:
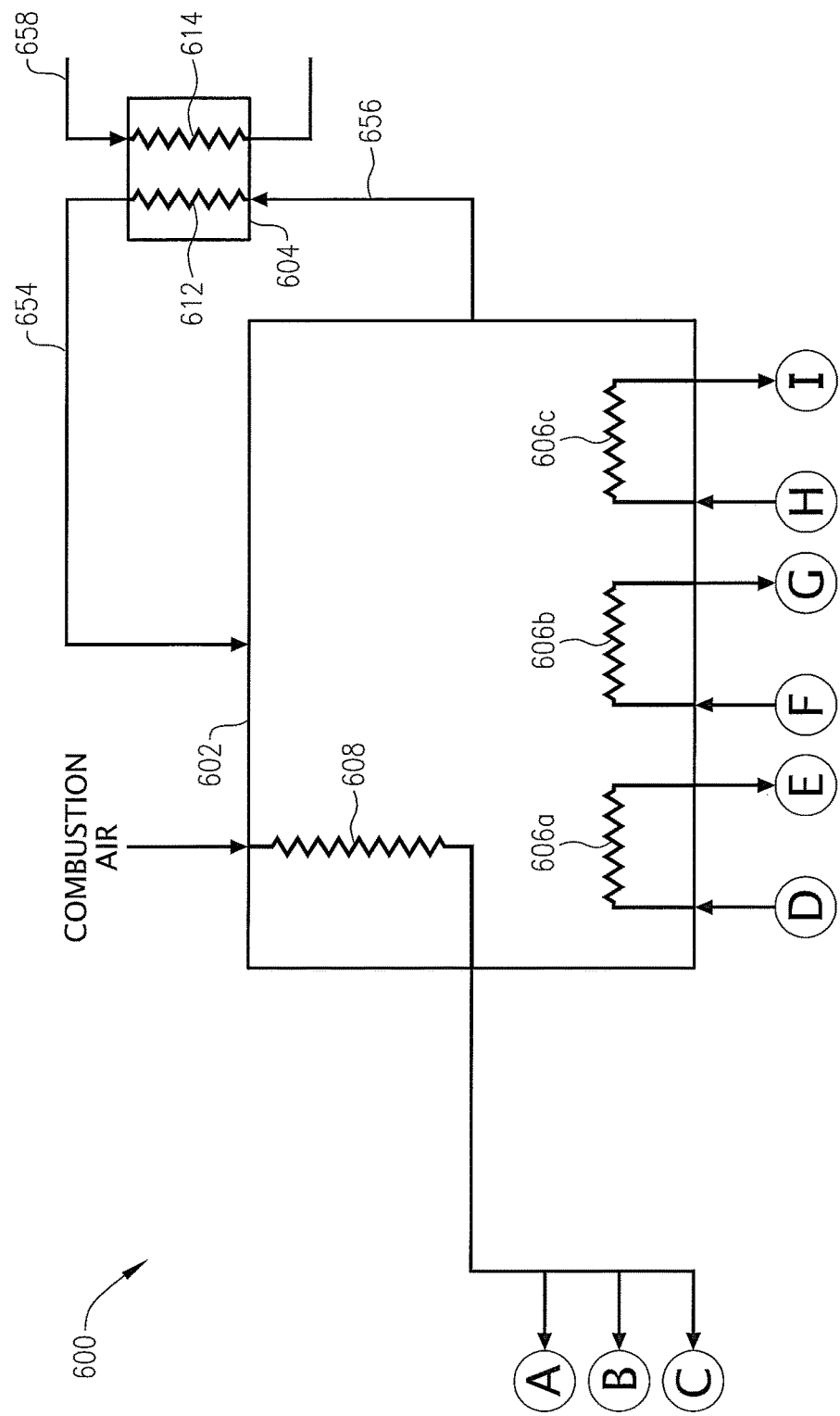
FIG. 4b. is a schematic diagram of an interstage cooling system configured according to one embodiment of the present invention that is integrated into the portion of the LNG facility illustrated in FIG. 4a via lines A, B, C, D, E, F, G, H, and I.

Referring first to FIGS. 4a and 4b, a cascade-type LNG facility in accordance with one embodiment of the present invention is illustrated. The portion of the LNG facility depicted in FIG. 4a generally comprises a propane refrigeration cycle 30, an ethylene refrigeration cycle 50, a methane refrigeration cycle 70 with an expansion section 80, and a heavies removal zone 95. While "propane," "ethylene," and "methane" are used to refer to respective first, second, and third refrigerants, it should be understood that the embodiment illustrated in FIG. 4a and described herein can apply to any combination of suitable refrigerants. The main components of propane refrigeration cycle 30 include a propane compressor 31, a propane cooler 32, a high-stage propane chiller 33, an intermediate-stage propane chiller 34, and a low-stage propane chiller 35. The main components of ethylene refrigeration cycle 50 include an ethylene compressor 51, an ethylene cooler 52, a high-stage ethylene chiller 53, an optional first low-stage ethylene chiller 54, a second low-stage ethylene chiller/condenser 55, and an ethylene economizer 56. The main components of methane refrigeration cycle 70 include a methane compressor 71, a methane cooler 72, a main methane economizer 73, and a secondary methane economizer 74. The main components of expansion section 80 include a high-stage methane expander 81, a high-stage methane flash drum 82, an intermediate-stage methane expander 83, an intermediate-stage methane flash drum 84, a low-stage methane expander 85, and a low-stage methane flash drum 86.

The portion of the LNG facility depicted in FIG. 4a includes a heavies removal zone located downstream of optional first low-stage ethylene chiller 54 for removing heavy hydrocarbon components from the processed natural gas and recovering the resulting natural gas liquids. The heavies removal zone 95 of FIG. 4a is shown as generally comprising a first distillation column 96 and a second distillation column 97.

The LNG facility of FIGS. 4a and 4b also includes an interstage cooling system 600, depicted in FIG. 4b. Lines A-I illustrate how interstage system 600 is integrated in the LNG facility illustrated in FIG. 4a. Interstage cooling system 600 will be discussed in more detail shortly with respect to FIG. 4b.

The operation of the LNG facility illustrated in FIG. 4a will now be described in more detail, beginning with propane refrigeration cycle 30. An inlet air (e.g., combustion air) stream in conduit A is introduced into gas turbine driver 31a, which is used to at least partially power propane compressor 31. Thereafter, a stream of partially compressed air is withdrawn from a low compression stage of gas turbine 31a and routed to interstage cooling system 600 illustrated in FIG. 4b via conduit D, as shown in FIG. 4a. A stream of cooled, partially compressed air withdrawn from interstage cooling system 600 in FIG. 4b can then be introduced via conduit E into propane gas turbine 31a, as illustrated in FIG. 4a. Additional details regarding the configuration and operation of interstage cooling system 600 will be discussed in detail shortly.

In general, propane compressor 31 can be a multi-stage (e.g., three stage) compressor. In one embodiment, the three stages of compression preferably exist in a single unit, although each stage of compression may be a separate unit and the units may be mechanically coupled and driven by a single driver. Upon compression, the propane is passed through conduit 300 to propane cooler 32, wherein it is cooled and at least partially liquefied via indirect heat exchange with an external fluid (e.g., air or water). A representative temperature and pressure of the liquefied propane refrigerant exiting cooler 32 is about 38° C. (100° F.) and about 1,310 kPa (190 psia).

As shown in FIG. 4a, the stream from propane cooler 32 can then enter conduit 302 and can be passed to a pressure reduction means, illustrated as expansion valve 36, wherein the pressure of the liquefied propane is reduced, thereby evaporating or flashing a portion thereof. The resulting two-phase stream then flows via conduit 304 into high-stage propane chiller 33. High stage propane chiller 33 uses indirect heat exchange means 37, 38, and 39 to cool respectively, the incoming gas streams, including a yet-to-be-discussed methane refrigerant stream in conduit 112, a natural gas feed stream in conduit 110, and a yet-to-be-discussed ethylene refrigerant stream in conduit 202 via indirect heat exchange with the vaporizing refrigerant. The cooled methane refrigerant stream exits high-stage propane chiller 33 via conduit 130 and can subsequently be routed to the inlet of main methane economizer 73, which will be discussed in greater detail in a subsequent section.

The cooled natural gas stream from high-stage propane chiller 33 (also referred to herein as the "methane-rich stream") flows via conduit 114 to a separation vessel 40, wherein the gaseous and liquid phases are separated. The liquid phase, which can be rich in propane and heavier components ($C_3+$), is removed via conduit 303. The predominately vapor phase exits separator 40 via conduit 116 and can then enter intermediate-stage propane chiller 34, wherein the stream is cooled in indirect heat exchange means 41 via indirect heat exchange with a yet-to-be-discussed propane refrigerant stream. The resulting two-phase methane-rich stream in conduit 118 can then be routed to low-stage propane chiller 35, wherein the stream can be further cooled via indirect heat exchange means 42. The resultant predominantly methane stream can then exit low-stage propane chiller 34 via conduit 120. Subsequently, the cooled methane-rich stream in conduit 120 can be routed to high-stage ethylene chiller 53, which will be discussed in more detail shortly.

The vaporized propane refrigerant can be withdrawn from high-stage propane chiller 33 via conduit 306 and can then be introduced into the high-stage suction port of propane compressor 31. The residual liquid propane refrigerant in high-stage propane chiller 33 can be passed via conduit 308 through a pressure reduction means, illustrated here as expansion valve 43, whereupon a portion of the liquefied refrigerant is flashed or vaporized. The resulting cooled, two-phase refrigerant stream can then enter intermediate-stage propane chiller 34 via conduit 310, thereby providing coolant for the natural gas stream and yet-to-be-discussed ethylene refrigerant stream entering intermediate-stage propane chiller 34. The vaporized propane refrigerant exits intermediate-stage propane chiller 34 via conduit 312 and can then enter the intermediate-stage inlet port of propane compressor 31. The remaining liquefied propane refrigerant exits intermediate-stage propane chiller 34 via conduit 314 and is passed through a pressure-reduction means, illustrated here as expansion valve 44, whereupon the pressure of the stream is reduced to thereby flash or vaporize a portion thereof. The resulting vapor-liquid refrigerant stream then enters low-stage propane chiller 35 via conduit 316 and cools the methane-rich and yet-to-be-discussed ethylene refrigerant streams entering low-stage propane chiller 35 via conduits 118 and 206, respectively. The vaporized propane refrigerant stream then exits low-stage propane chiller 35 and is routed to the low-stage inlet port of propane compressor 31 via conduit 318 wherein it is compressed and recycled as previously described.

As shown in FIG. 4a, a stream of ethylene refrigerant in conduit 202 enters high-stage propane chiller, wherein the ethylene stream is cooled via indirect heat exchange means 39. The resulting cooled stream in conduit 204 then exits high-stage propane chiller 33, whereafter the stream enters intermediate-stage propane chiller 34. Upon entering intermediate-stage propane chiller 34, the ethylene refrigerant stream can be further cooled via indirect heat exchange means 45. The resulting cooled ethylene stream can then exit intermediate-stage propane chiller 34 prior to entering low-stage propane chiller 35 via conduit 206. In low-stage propane chiller 35, the ethylene refrigerant stream can be at least partially condensed, or condensed in its entirety, via indirect heat exchange means 46. The resulting stream exits low-stage propane chiller 35 via conduit 208 and can subsequently be routed to a accumulator 47, as shown in FIG. 4a. The liquefied ethylene refrigerant stream exiting accumulator 47 via conduit 212 can have a representative temperature and pressure of about −30° C. (−22° F.) and about 2,032 kPa (295 psia).

Turning now to ethylene refrigeration cycle 50 in FIG. 4a, the liquefied ethylene refrigerant stream in conduit 212 can enter ethylene economizer 56, wherein the stream can be further cooled by an indirect heat exchange means 57. The sub-cooled liquid ethylene stream in conduit 214 can then be routed through a pressure reduction means, illustrated here as expansion valve 58, whereupon the pressure of the stream is reduced to thereby flash or vaporize a portion thereof. The cooled, two-phase stream in conduit 215 can then enter high-stage ethylene chiller 53, wherein at least a portion of the ethylene refrigerant stream can vaporize to thereby cool the methane-rich stream entering an indirect heat exchange means 59 of high-stage ethylene chiller 53 via conduit 120. The vaporized and remaining liquefied refrigerant exit high-stage ethylene chiller 53 via respective conduits 216 and 220. The vaporized ethylene refrigerant in conduit 216 can re-enter ethylene economizer 56, wherein the stream can be warmed via an indirect heat exchange means 60 prior to entering the high-stage inlet port of ethylene compressor 51 via conduit 218, as shown in FIG. 4a.

The remaining liquefied refrigerant in conduit 220 can re-enter ethylene economizer 56, wherein the stream can be further sub-cooled by an indirect heat exchange means 61. The resulting cooled refrigerant stream exits ethylene economizer 56 via conduit 222 and can subsequently be routed to a pressure reduction means, illustrated here as expansion valve 62, whereupon the pressure of the stream is reduced to thereby vaporize or flash a portion thereof. The resulting, cooled two-phase stream in conduit 224 enters optional first low-stage ethylene chiller 54, wherein the refrigerant stream can cool the natural gas stream in conduit 122 entering optional first low-stage ethylene chiller 54 via an indirect heat exchange means 63. As shown in FIG. 4*a*, the resulting cooled methane-rich stream exiting intermediate stage ethylene chiller 54 can then be routed to heavies removal zone 95 via conduit 124. Heavies removal zone 95 will be discussed in detail in a subsequent section.

The vaporized ethylene refrigerant exits optional first low-stage ethylene chiller 54 via conduit 226, whereafter the stream can combine with a yet-to-be-discussed ethylene vapor stream in conduit 238. The combined stream in conduit 240 can enter ethylene economizer 56, wherein the stream is warmed in an indirect heat exchange means 64 prior to being fed into the low-stage inlet port of ethylene compressor 51 via conduit 230.

As shown in FIG. 4*a*, an inlet air (e.g., combustion air) stream in conduit B can be introduced into an ethylene compressor gas turbine driver 51*a*, which is used to at least partially power ethylene compressor 51. Similarly to propane gas turbine 31*a*, a stream of partially compressed air withdrawn from a lower stage of gas turbine 51*a* can be routed to interstage cooling system 600 depicted in FIG. 4*b* via conduit F before being returned to a higher compression stage of gas turbine 51*a* via conduit G, as shown in FIG. 4*a*. In general, ethylene compressor 51 can comprise one or more compression stages. In one embodiment, three stages of compression preferably exist in a single unit, although each stage of compression may be a separate unit and the units may be mechanically coupled and driven by a single driver. Upon compression, a stream of compressed ethylene refrigerant in conduit 236 can subsequently be routed to ethylene cooler 52, wherein the ethylene stream can be cooled via indirect heat exchange with an external fluid (e.g., water or air). The resulting, at least partially condensed ethylene stream can then be introduced via conduit 202 into high-stage propane chiller 33 for additional cooling as previously described.

The remaining liquefied ethylene refrigerant exits optional first low-stage ethylene chiller 54 via conduit 228 prior to entering second low-stage ethylene chiller/condenser 55, wherein the refrigerant can cool the methane-rich stream exiting heavies removal zone 95 via conduit 126 via indirect heat exchange means 65 in second low-stage ethylene chiller/condenser 55. As shown in FIG. 4*a*, the vaporized ethylene refrigerant can then exit second low-stage ethylene chiller/condenser 55 via conduit 238 prior to combining with the vaporized ethylene exiting optional first low-stage ethylene chiller 54 and entering the low-stage inlet port of ethylene compressor 51, as previously discussed.

The cooled natural gas stream exiting low-stage ethylene chiller/condenser can also be referred to as the "pressurized LNG-bearing stream." As shown in FIG. 4*a*, the pressurized LNG-bearing stream exits second low-stage ethylene chiller/condenser 55 via conduit 132 prior to entering main methane economizer 73. In main methane economizer 73, the methane-rich stream can be cooled in an indirect heat exchange means 75 via indirect heat exchange with one or more yet-to-be discussed methane refrigerant streams. The cooled, pressurized LNG-bearing stream exits main methane economizer 73 and can then be routed via conduit 134 into expansion section 80 of methane refrigeration cycle 70. In expansion section 80, the cooled predominantly methane stream passes through high-stage methane expander 81, whereupon the pressure of the stream is reduced to thereby vaporize or flash a portion thereof. The resulting two-phase methane-rich stream in conduit 136 can then enter high-stage methane flash drum 82, whereupon the vapor and liquid portions can be separated. The vapor portion exiting high-stage methane flash drum 82 (i.e., the high-stage flash gas) via conduit 143 can then enter main methane economizer 73, wherein the stream is heated via indirect heat exchange means 76. The resulting warmed vapor stream exits main methane economizer 73 via conduit 138 and subsequently combines with a yet-to-be-discussed vapor stream exiting heavies removal zone 95 in conduit 140. The combined stream in conduit 141 can then be routed to the high-stage inlet port of methane compressor 71, as shown in FIG. 4*a*.

The liquid phase exiting high-stage methane flash drum 82 via conduit 142 can enter secondary methane economizer 74, wherein the methane stream can be cooled via indirect heat exchange means 92. The resulting cooled stream in conduit 144 can then be routed to a second expansion stage, illustrated here as intermediate-stage expander 83. Intermediate-stage expander 83 reduces the pressure of the methane stream passing therethrough to thereby reduce the stream's temperature by vaporizing or flashing a portion thereof. The resulting two-phase methane-rich stream in conduit 146 can then enter intermediate-stage methane flash drum 84, wherein the liquid and vapor portions of the stream can be separated and can exit the intermediate-stage flash drum via respective conduits 148 and 150. The vapor portion (i.e., the intermediate-stage flash gas) in conduit 150 can re-enter secondary methane economizer 74, wherein the stream can be heated via an indirect heat exchange means 87. The warmed stream can then be routed via conduit 152 to main methane economizer 73, wherein the stream can be further warmed via an indirect heat exchange means 77 prior to entering the intermediate-stage inlet port of methane compressor 71 via conduit 154.

The liquid stream exiting intermediate-stage methane flash drum 84 via conduit 148 can then pass through a low-stage expander 85, whereupon the pressure of the liquefied methane-rich stream can be further reduced to thereby vaporize or flash a portion thereof. The resulting cooled, two-phase stream in conduit 156 can then enter low-stage methane flash drum 86, wherein the vapor and liquid phases can be separated. The liquid stream exiting low-stage methane flash drum 86 can comprise the liquefied natural gas (LNG) product. The LNG product, which is at about atmospheric pressure, can be routed via conduit 158 downstream for subsequent storage, transportation, and/or use.

The vapor stream exiting low-stage methane flash drum (i.e., the low-stage methane flash gas) in conduit 160 can be routed to secondary methane economizer 74, wherein the stream can be warmed via an indirect heat exchange means 89. The resulting stream can exit secondary methane economizer 74 via conduit 162, whereafter the stream can be routed to main methane economizer 73 to be further heated via indirect heat exchange means 78. The warmed methane vapor stream can then exit main methane economizer 73 via conduit 164 prior to being routed to the low-stage inlet port of methane compressor 71.

Methane compressor 71 can comprise one or more compression stages and, can be at least partially driven by a gas turbine driver 71*a*. Similarly to propane gas turbine 31*a* and ethylene gas turbine 51*a*, a stream of partially compressed air withdrawn from a lower stage of methane gas turbine 71*a* can be routed to interstage cooling system 600 depicted in FIG. 4*b* via conduit H before being returned to methane gas turbine 71*a* via conduit I, as shown in FIG. 4*a*. In one embodiment, methane compressor 71 comprises three compression stages in a single module. In another embodiment, the compression modules can be separate, but can be mechanically coupled to gas turbine driver 71a. As shown in FIG. 4a, the compressed methane refrigerant stream exiting methane compressor 71 can be discharged into conduit 166, whereafter the stream can be cooled via indirect heat exchange with an external fluid (e.g., air or water) in methane cooler 72. The cooled methane refrigerant stream exiting methane cooler 72 can then enter conduit 112, whereafter the methane refrigerant stream can be further cooled in propane refrigeration cycle 30, as described in detail previously.

Upon being cooled in propane refrigeration cycle 30, the methane refrigerant stream can be discharged into conduit 130 and subsequently routed to main methane economizer 73, wherein the stream can be further cooled via indirect heat exchange means 79. The resulting sub-cooled stream exits main methane economizer 73 via conduit 168 and can then combined with the heavies-depleted stream exiting heavies removal zone 95 via conduit 126, as previously discussed.

Turning now to heavies removal zone 95, at least a portion of the predominantly methane stream withdrawn from optional first low-stage ethylene chiller 54 via conduit 124 can subsequently be introduced into first distillation column 96. As shown in FIG. 2, at least a portion of a predominantly vapor overhead stream withdrawn from first distillation column 96 can subsequently be routed to second low-stage ethylene chiller condenser 55, wherein the stream can be further cooled via indirect heat exchange means 65, as discussed in detail previously. A predominantly liquid, heavies-rich bottoms stream withdrawn from first distillation column 96 via conduit 170 can then be introduced into second distillation column 97. The predominantly liquid bottoms stream exiting second distillation column 97 via conduit 171, which generally comprises NGL, can be routed out of heavies removal zone 95 for subsequent storage, processing, and/or future use. The predominantly vapor overhead stream withdrawn from second distillation column 97 can be routed via conduit 140 to one or more locations within the LNG facility. In one embodiment, the stream can be introduced into the high-stage suction port of methane compressor 71. In another embodiment, the stream can be routed to storage or subjected to further processing and/or use.

Turning now to FIG. 4b, one embodiment of an interstage cooling system 600 is illustrated as generally comprising a primary heat exchanger 602 and a secondary heat exchanger 604. Turning to the operation of the interstage cooling system 600 illustrated in FIG. 4b, a stream of uncompressed combustion air can be introduced into primary heat exchanger 602, wherein the stream can be cooled in an indirect heat exchange means 608 via indirect heat exchange with a cooled stream of primary coolant entering heat exchanger 602 via conduit 654. The resulting cooled air stream in conduit 650 can be routed to gas turbines 31a, 51a, 71a of respective propane, ethylene, and methane 31, 51, 71 compressors via respective conduits A, B, C, as illustrated in FIG. 4a.

As discussed briefly with respect to FIG. 4a, partially compressed air streams withdrawn from low compression stages of respective gas turbines 31a, 51a, and 71a can be routed to warm fluid inlets of primary heat exchanger 602, as shown in FIG. 4b. In primary heat exchanger 602, the partially compressed air streams in conduits D, F, H can be cooled via respective indirect heat exchange means 606a-c to thereby provide cooled, partially compressed air streams in conduits E, G, I. As shown in FIG. 4b, at least a portion of these cooled, compressed air streams can subsequently be routed to a higher compression stage of gas turbines 31a, 51a, and 71a, as discussed previously with respect to FIG. 4a.

Referring back to FIG. 4b, the primary coolant stream in conduit 656 can be introduced into secondary heat exchanger 604, wherein the stream can be cooled in indirect heat exchange means 612 via indirect heat exchange with a stream of secondary coolant entering secondary heat exchanger 604 via conduit 658. The resulting warmed stream of secondary coolant can be routed to another location for subsequent processing, storage, use, and/or disposal, while the stream of cooled primary coolant can be reintroduced into primary heat exchanger 602 via conduit 654 to cool one or more air streams as discussed previously.

Figure 5A:
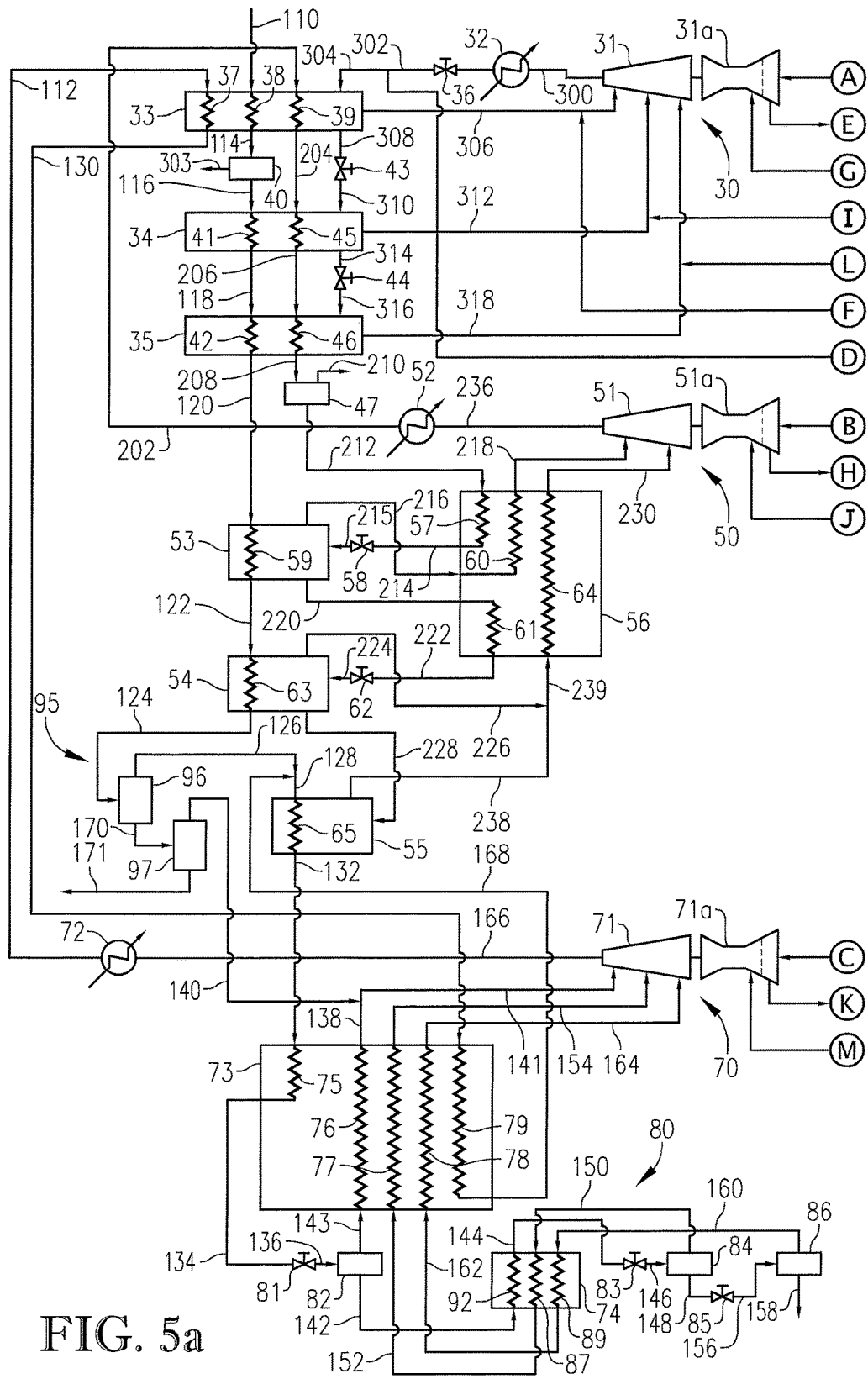
FIG. 5a is a schematic diagram of an LNG facility configured in accordance with another embodiment of the present invention with portions of the LNG facility connected to lines A, B, C, D, E, F, G, H, I, J, K, and L being illustrated in FIG. 5b.
Figure 5B:
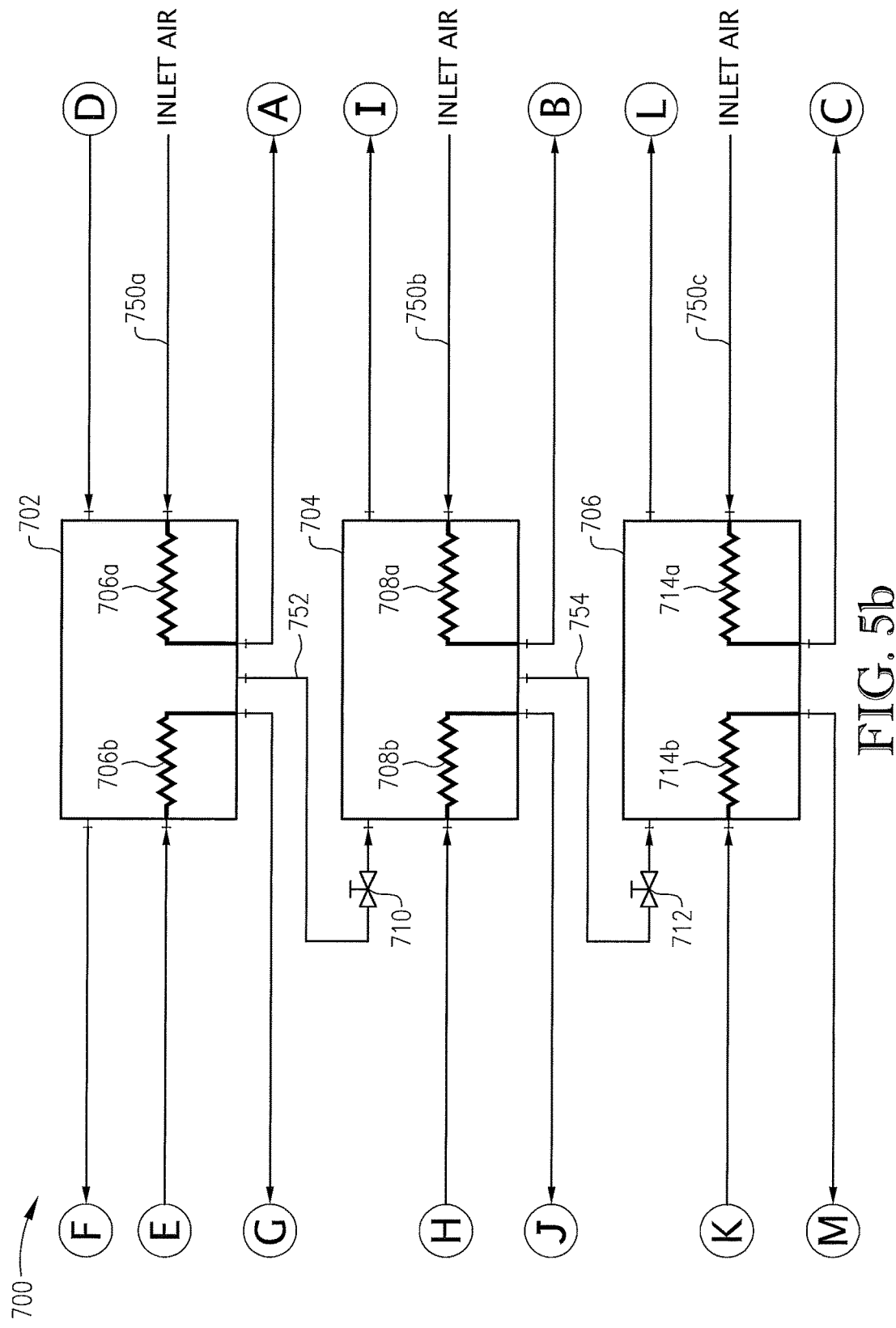
FIG. 5b. is a schematic diagram of an interstage cooling system configured according to another embodiment of the present invention that is integrated into the portion of the LNG facility illustrated in FIG. 5a via lines A, B, C, D, E, F, G, H, I, J, K, and L.

Turning now to FIGS. 5a and 5b, an LNG facility configured in accordance with another embodiment of the present invention is illustrated. The LNG facility configuration illustrated in FIGS. 5a and 5b is similar to the LNG configuration previously described with respect to FIGS. 4a and 4b, above, with like numerals designating like components. The operation of the LNG facility depicted in FIG. 5a, as it differs from the operation of the embodiment previously described with respect to FIG. 4a, will now be described in detail.

As shown in FIG. 5a, inlet air streams in conduits A, B, C can be introduced into combustion air inlets of respective gas turbines 31a, 51a, and 71a used to at least partially drive propane, ethylene, and methane compressors 31, 51, 71. Subsequently, streams of partially compressed air withdrawn from lower stages of gas turbines 31a, 51a, 71a can be routed to interstage cooling system 700 depicted in FIG. 5b via respective conduits E, H, K before being returned to gas turbines 31a, 51a, 71a via respective conduits G, J, M as shown in FIG. 5a. Interstage cooling system 700, illustrated in FIG. 5b, will be discussed in detail shortly.

As illustrated in FIG. 5a, a stream of compressed propane discharged from propane compressor 31 in conduit 300 can subsequently be passed through propane cooler 32. The resulting cooled, at least partially liquefied stream can then pass through pressure reduction mean 36 and, thereafter, the stream in conduit 302 can be split into two portions. The first portion, in conduit 304, can be introduced into high-stage propane chiller 33 and can be used to cool the natural gas stream entering the LNG facility via conduit 110, as discussed previously. The second portion of the refrigerant stream in conduit 302 can be routed via conduit D to interstage cooling system 700, illustrated in FIG. 5b. Subsequently, warmed refrigerant streams in conduits F, I, L from interstage cooling system 700 in FIG. 5b can respectively be returned to high-stage, intermediate-stage, and low-stage suction ports of propane compressor 31, as shown in FIG. 5a.

Turning now to FIG. 5b, another embodiment of an interstage cooling system 700 is illustrated as generally comprising first, second, and third interstage coolers 702, 704, 706. In operation, a combustion air stream in conduit 750a and a stream of partially compressed air withdrawn from a low compression stage of propane gas turbine 31a in conduit E can be introduced into first interstage cooler 702. As shown in FIG. 5b, a stream of cooled propane refrigerant withdrawn from the discharge of propane compressor 31 in FIG. 5a can be introduced into first interstage cooler 702 via conduit D, as shown in FIG. 5b. In first interstage cooler 702, the combustion air stream and partially compressed air stream can be cooled via indirect heat exchange with the vaporizing refrigerant via respective indirect heat exchange means 706a and 706b. The resulting cooled combustion air stream and the cooled, partially compressed air stream can be withdrawn from first interstage cooler 702 via respective conduits A and G.

Thereafter, the cooled air streams can be respectively routed to a combustion air inlet and one or more compression stages of gas turbine 31a, as illustrated in and discussed previously with respect to FIG. 5a. As shown in FIG. 5b, a stream of warmed, vaporized propane refrigerant can be withdrawn from a warm refrigerant outlet of first interstage cooler 702 and can subsequently be routed to the high-stage suction port of propane compressor via conduit F, as shown in FIG. 5a, while the remaining, predominantly liquid propane refrigerant can exit first interstage cooler 702 via conduit 752, as illustrated in FIG. 5b.

Prior to entering second interstage cooler 704, the stream of predominantly liquid propane refrigerant can pass through an optional pressure reduction means, illustrated here as expansion valve 710, wherein the pressure of the stream can be reduced, evaporating or flashing a portion thereof. The resulting refrigerant stream can then be introduced into a cool refrigerant inlet of second interstage cooler 704. In second interstage cooler 704, a stream of uncompressed combustion air in conduit 750b and a stream of partially compressed air withdrawn from a low compression stage of ethylene gas turbine 51a in conduit H can be cooled via indirect heat exchange with the vaporizing propane refrigerant in respective indirect heat exchange means 708a and 708b. A stream of vaporized propane refrigerant can be withdrawn from second interstage cooler 704 via conduit I and can then be introduced into the intermediate-stage suction port of propane compressor 31, as shown in FIG. 5a. The resulting cooled combustion air stream withdrawn from second interstage cooler 704 via conduit B, as shown in FIG. 5b, can subsequently be routed to a combustion air inlet of gas turbine 51a, while the cooled partially compressed air stream withdrawn from second interstage cooler 704 via conduit J can be introduced into a higher compression stage of gas turbine 51a, as illustrated in FIG. 5a.

According to one embodiment depicted in FIG. 5b, the remaining predominantly liquid propane stream withdrawn from second interstage cooler 704 via conduit 754 can optionally pass through a pressure reduction means, illustrated here as expander 712. The resulting refrigerant stream can then be introduced into a warm refrigerant inlet of third interstage cooler 706, wherein the stream can at least partially cool the stream of uncompressed combustion air in conduit 750c and the stream of partially compressed air withdrawn from a low compression stage of methane gas turbine 71a, illustrated in FIG. 5a, in conduit K via respective indirect heat exchange means 714a and 714b, as shown in FIG. 5b. The resulting, predominantly vaporized propane refrigerant stream withdrawn from third interstage cooler 706 via conduit L can subsequently be routed to the low-stage suction port of propane compressor 31, as illustrated in FIG. 5a.

In one embodiment of the present invention, the LNG production systems illustrated in FIGS. 1-3, 4a, 4b, 5a, and 5b can be simulated on a computer using conventional process simulation software in order to generate process simulation data in a human-readable form. In one embodiment, the process simulation data can be in the form of a computer print out. In another embodiment, the process simulation data can be displayed on a screen, a monitor, or other viewing device. The simulation data can then be used to manipulate the LNG system. In one embodiment, the simulation results can be used to design a new LNG facility and/or revamp or expand an existing facility. In another embodiment, the simulation results can be used to optimize the LNG facility according to one or more operating parameters. Examples of suitable software for producing the simulation results include HYSYS™ or Aspen Plus® from Aspen Technology, Inc., and PRO/I®(t from Simulation Sciences Inc.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "a," "an," "the," and "said" mean one or more.

As used herein, the term "aeroderivative gas turbine" refers to a gas turbine having a design based on an aircraft engine that has been adapted for industrial use.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "cascade-type refrigeration process" refers to a refrigeration process that employs a plurality of refrigeration cycles, each employing a different pure component refrigerant to successively cool natural gas.

As used herein, the term "closed-loop refrigeration cycle" refers to a refrigeration cycle wherein substantially no refrigerant enters or exits the cycle during normal operation.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided above.

As used herein, the terms "economizer" or "economizing heat exchanger" refer to a configuration utilizing a plurality of heat exchangers employing indirect heat exchange means to efficiently transfer heat between process streams.

As used herein, the term "fluid flow communication" between two components means that at least a portion of the fluid or material from the first component enters, passes through, or otherwise comes into contact with the second component.

As used herein, the terms "having," "has," and "have" have the same open-ended meaning as "comprising," "comprises," and "comprise," provided above.

As used herein, the terms "heavy hydrocarbon" and "heavies" refer to any component that is less volatile (i.e., has a higher boiling point) than methane.

As used herein, the terms "including," "includes," and "include" have the same open-ended meaning as "comprising," "comprises," and "comprise," provided above.

As used herein, the term "mid-range standard boiling point" refers to the temperature at which half of the weight of a mixture of physical components has been vaporized (i.e., boiled off) at standard pressure.

As used herein, the term "mixed refrigerant" refers to a refrigerant containing a plurality of different components, where no single component makes up more than 65 mole percent of the refrigerant.

As used herein, the term "modular" refers to a turbine having interchangeable segments.

As used herein, the term "natural gas" means a stream containing at least about 60 mole percent methane, with the balance being inerts, ethane, higher hydrocarbons, nitrogen, carbon dioxide, and/or a minor amount of other contaminants such as mercury, hydrogen sulfide, and mercaptan.

As used herein, the terms "natural gas liquids" or "NGL" refer to mixtures of hydrocarbons whose components are, for example, typically heavier than methane. Some examples of hydrocarbon components of NGL streams include ethane, propane, butane, and pentane isomers, benzene, toluene, and other aromatic compounds.

As used herein, the term "open-loop refrigeration cycle" refers to a refrigeration cycle wherein at least a portion of the refrigerant employed during normal operation originates from the fluid being cooled by the refrigerant cycle.

As used herein, the terms "predominantly," "primarily," "principally," and "in major portion," when used to describe the presence of a particular component of a fluid stream, means that the fluid stream comprises at least 50 mole percent of the stated component. For example, a "predominantly" methane stream, a "primarily" methane stream, a stream "principally" comprised of methane, or a stream comprised "in major portion" of methane each denote a stream comprising at least 50 mole percent methane.

As used herein, the term "pure component refrigerant" means a refrigerant that is not a mixed refrigerant.

As used herein, the terms "upstream" and "downstream" refer to the relative positions of various components of a natural gas liquefaction facility along a fluid flow path in an LNG facility. For example, a component A is located downstream of another component B if component A is positioned along a fluid flow path that has already passed through component B. Likewise, component A is located upstream of component B if component A is located on a fluid flow path that has not yet passed through component B.

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process for liquefying a natural gas stream, the process comprising:

(a) cooling at least a portion of the natural gas stream via indirect heat exchange with a first refrigerant in a first refrigeration cycle to produce a cooled natural gas stream;

(b) further cooling at least a portion of the cooled natural gas stream via indirect heat exchange with a second refrigerant in a second refrigeration cycle to provide a further cooled natural gas stream; and (c) partially compressing an air stream with a low compression stage to provide a partially compressed air stream;

(d) cooling the air stream and the partially compressed air stream via indirect heat exchanger with a primary coolant selected from the group consisting of: the first refrigerant, the second refrigerant, and any combination thereof, to provide a cooled inlet air stream and a cooled partially compressed air stream, wherein the partially compressed air stream is withdrawn from an intermediate compression stage of a gas turbine used to drive at least one refrigerant compressor associated with the first or the second refrigeration cycle, or both; and (e) introducing the cooled inlet air stream into an inlet of the gas turbine.

2. The process of claim 1, wherein the cooling step (d) results in a warmed primary coolant stream; further comprising cooling at least a portion of the warmed primary coolant stream via indirect heat exchange with a secondary coolant stream to thereby provide a cooled primary coolant stream and using at least a portion of the cooled primary coolant stream to accomplish at least a portion of the cooling step (d).

3. The process of claim 2, wherein the secondary coolant stream comprises air.

4. The process of claim 1, wherein the first and second refrigerants are each comprised predominately of hydrocarbons.

5. The process of claim 1, wherein the first refrigerant is comprised predominately of propane, propylene, ethane, or ethylene.

6. The process of claim 1, wherein the first refrigerant is comprised predominately of propane.

7. The process of claim 6, wherein the second refrigerant is a mixed hydrocarbon refrigerant.

8. The process of claim 6, wherein the second refrigerant is comprised predominately of ethane, ethylene, methane, or nitrogen.

9. The process of claim 1, wherein the cooling of step (d) cools the partially compressed air stream to a temperature that is at least 1° C. cooler than the temperature of an uncompressed air stream being supplied to the inlet of the gas turbine.

10. The process of claim 1, wherein the partially compressed air steam and the air stream are cooled in a common heat exchanger.

11. The process of claim 1, wherein the gas turbine is dual-shaft or triple-shaft gas turbine.

12. The process of claim 11, wherein the gas turbine is a triple-shaft gas turbine.

13. The process of claim 12, wherein the first refrigerant is predominately comprised of propane, wherein the second refrigerant is a mixed hydrocarbon refrigerant.

14. The process of claim 13, further comprising cooling at least a portion of the further cooled natural gas stream in a third refrigeration cycle, wherein the third refrigeration cycle comprises a nitrogen refrigeration cycle.

15. The process of claim 1, further comprising cooling at least a portion of the further cooled natural gas stream in a third refrigeration cycle, wherein the third refrigeration cycle comprises and open-loop methane refrigeration cycle.

16. The process of claim 1, further comprising, intermediate to step (b), separating at least a portion of the cooled natural gas stream in a heavies removal column to provide a predominately methane overhead product and a heavies-rich bottom product, wherein the further cooled natural gas stream comprises at least a portion of the predominately methane overhead product.

17. The process of claim 1, wherein the first and the second refrigerants are pure-component refrigerants, wherein the first and second refrigerants have different compositions.

18. The process of claim 1, further comprising introducing the cooled partially compressed air stream to a high compression stage of the gas turbine.

19. A process for liquefying a natural gas stream, the process comprising:
   (a) compressing a first refrigerant stream in a first refrigerant compressor to provide a first compressed refrigerant stream, wherein the first refrigerant compressor is at least partially driven by a first gas turbine;
   (b) compressing a first air stream with a low compression stage to provide a partially compressed air stream;
   (c) cooling the partially compressed air stream via indirect heat exchange with at least a portion of the first compressed refrigerant stream to provide a first cooled air stream and a cooled partially compressed air stream; and
   (d) introducing at least a portion of the first cooled air stream into the first gas turbine.

20. The process of claim 19, further comprising cooling a second air stream via indirect heat exchange with the first refrigerant to provide a second cooled air stream and introducing the second cooled air stream into first gas turbine, wherein the second air stream is an uncompressed air stream, wherein the second cooled air stream is introduced into the low compression stage of the first gas turbine.

21. The process of claim 19, further comprising cooling a second air stream via indirect heat exchange with the first refrigerant to provide a second cooled air stream and introducing the second cooled air stream into a second gas turbine used to power a second refrigerant compressor operable to compress a second refrigerant system.

22. The process of claim 21, wherein the first and the second refrigerant streams have different compositions.

23. The process of claim 22, wherein the first and the second refrigerant streams are comprised predominately of hydrocarbons.

24. The process of claim 21, wherein the first refrigerant stream comprises predominately propane, wherein the second refrigerant stream comprises predominately ethylene, ethane, nitrogen, or methane.

25. The process of claim 24, further comprising using at least a portion of the first and the second refrigerant streams to cool the natural gas stream to provide a cooled natural gas stream and further cooling the cooled natural gas stream via indirect heat exchange with a third predominately methane refrigerant.

26. The process of claim 21, wherein the first refrigerant is comprised predominately of propane, wherein the second refrigerant is a mixed hydrocarbon refrigerant.

27. The process of claim 19, wherein the cooling step (b) cools the first air stream by no more than 25° C., wherein none of the cooling of step (b) is accomplished via direct heat exchange.

28. The process of claim 19, wherein the first gas turbine is a multi-shaft gas turbine.

29. The process of claim 19, further comprising introducing the cooled partially compressed air stream to a high compression stage of the gas turbine.

30. A liquefied natural gas (LNG) facility, the LNH facility comprising: a first refrigeration cycle comprising a first refrigerant compressor, a first refrigerant chiller, and a first gas turbine, wherein the first refrigerant compressor is operable to produce a compressed first refrigerant stream and the first refrigerant chiller is operable to cool a natural gas stream via indirect heat exchange with the compressed first refrigerant stream to produce a cooled natural gas stream, wherein the first compressor is driven by the first gas turbine, wherein the first gas turbine is a multi-shaft gas turbine comprising a first low compression stage and a first high compression stage; and a first heat exchange zone operable to cool a first partially compressed air stream withdrawn from the first low compression stage via indirect heat exchange with the compressed first refrigerant stream to produce a first cooled air stream, wherein the first high compression stage is configured to receive the first cooled air stream.

31. The facility of claim 30, further comprising a second refrigeration cycle comprising a second refrigerant compressor operable to produce a compressed second refrigerant stream and a second refrigerant chiller operable to cool the cooled natural gas stream via indirect heat exchange with the compressed second refrigerant stream, wherein the second compressor is driven by a second multi-stage, multi-shaft gas turbine, wherein the second gas turbine comprises a second low compression stage and a second high compression stage, the first heat exchange zone further operable to cool a second partially compressed air stream withdrawn from the second low compression stage via indirect heat exchange with said first coolant to produce a second cooled air stream, wherein the second high compression stages is operable to receive the second cooled air stream.

32. The facility of claim 30, wherein the first refrigeration cycle comprises a closed-loop propane refrigeration cycle, wherein the second refrigeration cycle comprises a mixed refrigerant cycle.

33. The facility of claim 30, wherein the first refrigeration cycle comprises a closed-loop propane refrigeration cycle, wherein the second refrigeration cycle comprises a closed loop refrigeration cycle, wherein the second refrigeration comprises predominately ethane, ethylene, or nitrogen.

34. The facility of claim 30, wherein the first heat exchange zone comprises a single heat exchanger.

35. The facility of claim 30, wherein the multi-stage, multi-shaft first gas turbine is a triple-shaft gas turbine.

* * * * *